United States Patent
Routh et al.

(10) Patent No.: US 8,892,413 B2
(45) Date of Patent: Nov. 18, 2014

(54) CONVERGENCE RATE OF FULL WAVEFIELD INVERSION USING SPECTRAL SHAPING

(75) Inventors: Partha S. Routh, Katy, TX (US); Spyridon K. Lazaratos, Houston, TX (US); Anatoly Baumstein, Houston, TX (US); Ivan Chikichev, Houston, TX (US); Ke Wang, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 330 days.

(21) Appl. No.: 13/361,609

(22) Filed: Jan. 30, 2012

(65) Prior Publication Data

US 2013/0028052 A1 Jan. 31, 2013

Related U.S. Application Data

(60) Provisional application No. 61/469,478, filed on Mar. 30, 2011, provisional application No. 61/508,440, filed on Jul. 15, 2011.

(51) Int. Cl.
*G06G 7/48* (2006.01)
*G01V 1/28* (2006.01)

(52) U.S. Cl.
CPC .............. *G01V 1/28* (2013.01); *G01V 2210/67* (2013.01); *G01V 2210/66* (2013.01)
USPC ................................................ 703/10; 702/6

(58) Field of Classification Search
CPC ............. G01V 1/00; G01V 1/28; G01V 1/30; G01V 1/301; G01V 2210/66; G01V 2210/67
USPC ........................................... 703/1, 10; 702/6
See application file for complete search history.

(56) References Cited

U.S. PATENT DOCUMENTS

| 3,812,457 A | 5/1974 | Weller |
| 3,864,667 A | 2/1975 | Bahjat |

(Continued)

FOREIGN PATENT DOCUMENTS

| EP | 1 094 338 | 4/2001 |
| EP | 1 746 443 | 1/2007 |

(Continued)

OTHER PUBLICATIONS

International Search Report and Written Opinion, dated Apr. 3, 2012, PCT/US2012/023137.

(Continued)

*Primary Examiner* — Eunhee Kim
(74) *Attorney, Agent, or Firm* — ExxonMobil Upstream Research Company Law Dept.

(57) ABSTRACT

Method for speeding up iterative inversion of seismic data (106) to obtain a subsurface model (102), using local cost function optimization. The frequency spectrum of the updated model at each iteration is controlled to match a known or estimated frequency spectrum for the subsurface region, preferably the average amplitude spectrum of the subsurface P-impedance. The controlling is done either by applying a spectral-shaping filter to the source wavelet (303) and to the data (302) or by applying the filter, which may vary with time, to the gradient of the cost function (403). The source wavelet's amplitude spectrum (before filtering) should satisfy $D(f)=fI_p(f)W(f)$, where f is frequency, $D(f)$ is the average amplitude spectrum of the seismic data, and $I_p(f)$ is the average amplitude spectrum for P-impedance in the subsurface region (306,402) or an approximation thereof.

22 Claims, 8 Drawing Sheets

(56) References Cited

U.S. PATENT DOCUMENTS

| | | | |
|---|---|---|---|
| 4,159,463 | A | 6/1979 | Silverman |
| 4,168,485 | A | 9/1979 | Payton et al. |
| 4,545,039 | A | 10/1985 | Savit |
| 4,562,540 | A | 12/1985 | Devaney |
| 4,575,830 | A | 3/1986 | Ingram et al. |
| 4,594,662 | A | 6/1986 | Devaney |
| 4,636,956 | A | 1/1987 | Vannier et al. |
| 4,675,851 | A | 6/1987 | Savit et al. |
| 4,686,654 | A | 8/1987 | Savit |
| 4,707,812 | A | 11/1987 | Martinez |
| 4,715,020 | A | 12/1987 | Landrum, Jr. |
| 4,766,574 | A | 8/1988 | Whitmore et al. |
| 4,780,856 | A | 10/1988 | Becquey |
| 4,823,326 | A | 4/1989 | Ward |
| 4,924,390 | A | 5/1990 | Parsons et al. |
| 4,953,657 | A | 9/1990 | Edington |
| 4,969,129 | A | 11/1990 | Currie |
| 4,982,374 | A | 1/1991 | Edington et al. |
| 5,260,911 | A | 11/1993 | Mason et al. |
| 5,469,062 | A | 11/1995 | Meyer, Jr. |
| 5,583,825 | A | 12/1996 | Carrazzone et al. |
| 5,677,893 | A | 10/1997 | de Hoop et al. |
| 5,715,213 | A | 2/1998 | Allen |
| 5,717,655 | A | 2/1998 | Beasley |
| 5,719,821 | A | 2/1998 | Sallas et al. |
| 5,721,710 | A | 2/1998 | Sallas et al. |
| 5,790,473 | A | 8/1998 | Allen |
| 5,798,982 | A | 8/1998 | He et al. |
| 5,822,269 | A | 10/1998 | Allen |
| 5,838,634 | A | 11/1998 | Jones et al. |
| 5,852,588 | A | 12/1998 | de Hoop et al. |
| 5,878,372 | A | 3/1999 | Tabarovsky et al. |
| 5,920,828 | A | 7/1999 | Norris et al. |
| 5,924,049 | A | 7/1999 | Beasley et al. |
| 5,999,488 | A | 12/1999 | Smith |
| 5,999,489 | A | 12/1999 | Lazaratos |
| 6,014,342 | A | 1/2000 | Lazaratos |
| 6,021,094 | A | 2/2000 | Ober et al. |
| 6,028,818 | A | 2/2000 | Jeffryes |
| 6,058,073 | A | 5/2000 | VerWest |
| 6,125,330 | A | 9/2000 | Robertson et al. |
| 6,219,621 | B1 | 4/2001 | Hornbostel |
| 6,225,803 | B1 | 5/2001 | Chen |
| 6,311,133 | B1 | 10/2001 | Lailly et al. |
| 6,317,695 | B1 | 11/2001 | Zhou et al. |
| 6,327,537 | B1 | 12/2001 | Ikelle |
| 6,374,201 | B1 | 4/2002 | Grizon et al. |
| 6,381,543 | B1 | 4/2002 | Guerillot et al. |
| 6,388,947 | B1 | 5/2002 | Washbourne et al. |
| 6,480,790 | B1 | 11/2002 | Calvert et al. |
| 6,516,275 | B2 | 2/2003 | Lazaratos |
| 6,522,973 | B1 | 2/2003 | Tonellot et al. |
| 6,545,944 | B2 | 4/2003 | de Kok |
| 6,549,854 | B1 | 4/2003 | Malinverno et al. |
| 6,574,564 | B2 | 6/2003 | Lailly et al. |
| 6,662,147 | B1 | 12/2003 | Fournier et al. |
| 6,665,615 | B2 | 12/2003 | Van Riel et al. |
| 6,687,619 | B2 | 2/2004 | Moerig et al. |
| 6,687,659 | B1 | 2/2004 | Shen |
| 6,704,245 | B2 | 3/2004 | Becquey |
| 6,714,867 | B2 | 3/2004 | Meunier |
| 6,735,527 | B1 | 5/2004 | Levin |
| 6,754,590 | B1 | 6/2004 | Moldoveanu |
| 6,766,256 | B2 | 7/2004 | Jeffryes |
| 6,826,486 | B1 | 11/2004 | Malinverno |
| 6,836,448 | B2 | 12/2004 | Robertsson et al. |
| 6,842,701 | B2 | 1/2005 | Moerig et al. |
| 6,859,734 | B2 | 2/2005 | Bednar |
| 6,865,487 | B2 | 3/2005 | Charron |
| 6,865,488 | B2 | 3/2005 | Moerig et al. |
| 6,876,928 | B2 | 4/2005 | Van Riel et al. |
| 6,882,938 | B2 | 4/2005 | Vaage et al. |
| 6,882,958 | B2 | 4/2005 | Schmidt et al. |
| 6,901,333 | B2 | 5/2005 | Van Riel et al. |
| 6,903,999 | B2 | 6/2005 | Curtis et al. |
| 6,927,698 | B2 | 8/2005 | Stolarcyzk |
| 6,944,546 | B2 | 9/2005 | Xiao et al. |
| 6,947,843 | B2 | 9/2005 | Fisher et al. |
| 6,970,397 | B2 | 11/2005 | Castagna et al. |
| 6,977,866 | B2 | 12/2005 | Huffman et al. |
| 6,999,880 | B2 | 2/2006 | Lee |
| 7,027,927 | B2 | 4/2006 | Matsuoka et al. |
| 7,046,581 | B2 | 5/2006 | Calvert |
| 7,050,356 | B2 | 5/2006 | Jeffryes |
| 7,069,149 | B2 | 6/2006 | Goff et al. |
| 7,072,767 | B2 | 7/2006 | Routh et al. |
| 7,092,823 | B2 | 8/2006 | Lailly et al. |
| 7,110,900 | B2 | 9/2006 | Adler et al. |
| 7,184,367 | B2 | 2/2007 | Yin |
| 7,230,879 | B2 | 6/2007 | Herkenhoff et al. |
| 7,271,747 | B2 | 9/2007 | Baraniuk et al. |
| 7,330,799 | B2 | 2/2008 | Lefebvre et al. |
| 7,337,069 | B2 | 2/2008 | Masson et al. |
| 7,373,251 | B2 | 5/2008 | Hamman et al. |
| 7,373,252 | B2 | 5/2008 | Sherrill et al. |
| 7,376,046 | B2 | 5/2008 | Jeffryes |
| 7,376,539 | B2 | 5/2008 | Lecomte |
| 7,400,978 | B2 | 7/2008 | Langlais et al. |
| 7,436,734 | B2 | 10/2008 | Krohn |
| 7,480,206 | B2 | 1/2009 | Hill |
| 7,584,056 | B2 | 9/2009 | Koren |
| 7,599,798 | B2 | 10/2009 | Beasley et al. |
| 7,602,670 | B2 | 10/2009 | Jeffryes |
| 7,616,523 | B1 | 11/2009 | Tabti et al. |
| 7,620,534 | B2 | 11/2009 | Pita et al. |
| 7,646,924 | B2 | 1/2010 | Donoho |
| 7,672,194 | B2 | 3/2010 | Jeffryes |
| 7,672,824 | B2 | 3/2010 | Dutta et al. |
| 7,675,815 | B2 | 3/2010 | Saenger et al. |
| 7,679,990 | B2 | 3/2010 | Herkenhoff et al. |
| 7,715,985 | B2 | 5/2010 | Van Manen et al. |
| 7,715,986 | B2 | 5/2010 | Nemeth et al. |
| 7,725,266 | B2 | 5/2010 | Sirgue et al. |
| 7,791,980 | B2 | 9/2010 | Robertsson et al. |
| 7,835,072 | B2 | 11/2010 | Izumi |
| 7,840,625 | B2 | 11/2010 | Candes et al. |
| 7,940,601 | B2 | 5/2011 | Ghosh |
| 8,121,791 | B2 * | 2/2012 | Lazaratos et al. ............... 702/14 |
| 8,537,638 | B2 * | 9/2013 | Lee et al. .......... 367/73 |
| 2002/0099504 | A1 | 7/2002 | Cross et al. |
| 2002/0120429 | A1 | 8/2002 | Ortoleva |
| 2002/0183980 | A1 | 12/2002 | Guillaume |
| 2004/0199330 | A1 | 10/2004 | Routh et al. |
| 2005/0013195 | A1 * | 1/2005 | Garotta ..................... 367/38 |
| 2006/0235666 | A1 | 10/2006 | Assa et al. |
| 2007/0036030 | A1 | 2/2007 | Baumel et al. |
| 2007/0274155 | A1 | 11/2007 | Ikelle |
| 2008/0175101 | A1 | 7/2008 | Saenger et al. |
| 2008/0306692 | A1 | 12/2008 | Singer et al. |
| 2009/0052278 | A1 | 2/2009 | Iranpour et al. |
| 2009/0067041 | A1 | 3/2009 | Krauklis et al. |
| 2009/0070042 | A1 | 3/2009 | Birchwood et al. |
| 2009/0083006 | A1 | 3/2009 | Mackie |
| 2009/0164186 | A1 | 6/2009 | Haase et al. |
| 2009/0187391 | A1 | 7/2009 | Wendt et al. |
| 2009/0248308 | A1 | 10/2009 | Luling |
| 2009/0254320 | A1 | 10/2009 | Lovatini et al. |
| 2009/0259406 | A1 | 10/2009 | Khadhraoui et al. |
| 2010/0008184 | A1 | 1/2010 | Hegna et al. |
| 2010/0018718 | A1 * | 1/2010 | Krebs et al. ................. 166/369 |
| 2010/0039894 | A1 | 2/2010 | Abma et al. |
| 2010/0054082 | A1 | 3/2010 | McGarry |
| 2010/0088035 | A1 | 4/2010 | Etgen et al. |
| 2010/0103772 | A1 | 4/2010 | Eick et al. |
| 2010/0118651 | A1 | 5/2010 | Liu et al. |
| 2010/0142316 | A1 | 6/2010 | Keers et al. |
| 2010/0142323 | A1 | 6/2010 | Chu et al. |
| 2010/0161233 | A1 | 6/2010 | Saenger et al. |
| 2010/0161234 | A1 | 6/2010 | Saenger et al. |
| 2010/0185422 | A1 | 7/2010 | Hoversten |
| 2010/0208554 | A1 | 8/2010 | Chiu et al. |
| 2010/0212909 | A1 | 8/2010 | Baumstein et al. |
| 2010/0265797 | A1 | 10/2010 | Robertsson et al. |
| 2010/0270026 | A1 * | 10/2010 | Lazaratos et al. ............. 166/369 |

(56) References Cited

U.S. PATENT DOCUMENTS

| | | |
|---|---|---|
| 2010/0286919 A1 | 11/2010 | Lee et al. |
| 2010/0299070 A1 | 11/2010 | Abma |
| 2011/0000678 A1* | 1/2011 | Krebs et al. .................. 166/369 |
| 2011/0040926 A1 | 2/2011 | Donderici et al. |
| 2011/0051553 A1 | 3/2011 | Scott et al. |
| 2011/0069581 A1* | 3/2011 | Krohn ............................ 367/43 |

FOREIGN PATENT DOCUMENTS

| | | |
|---|---|---|
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |

OTHER PUBLICATIONS

Dickens, T.A. et al. (2011), RTM angle gathers using Poynting vectors, *SEG Expanded Abstracts* 30, pp. 3109-3113.

Helbig, K. (1994), "Foundations of Anisotropy for Exploration Seismics," Chapter 5, pp. 185-194.

Hu, L.Z. et al. (1987), "Wave-field transformations of vertical seismic profiles," *Geophysics* 52, pp. 307-321.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.

Lazaratos, S. et al. (2011), "Improving the convergence rate of full wavefield inversion using spectral shaping," *SEG Expanded Abstracts* 30, pp. 2428-2432.

Liu, F. et al. (2007), "Reverse-time migration using one-way wavefield imaging condition," *SEG Expanded Abstracts* 26, pp. 2170-2174.

Liu, F. et al. (2011), "An effective imaging condition for reverse-time migration using wavefield decomposition," *Geophysics* 76, pp. S29-S39.

Mora, P. (1987), "Elastic Wavefield Inversion," PhD Thesis, Stanford University, pp. 22-25.

Mora, P. (1989), "Inversion = migration + tomography," *Geophysics* 64, pp. 888-901.

Pratt, R.G. et al. (1998), "Gauss-Newton and full Newton methods in frequency-space seismic waveform inversion," *Geophys. J. Int.* 133, pp. 341-362.

Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.

Sheng, J. et al. (2006), "Early arrival waveform tomography on near-surface refraction data," *Geophysics* 71, pp. U47-U57.

Simard, P.Y. et al. (1990), "Vector Field Restoration by the Method of Convex Projections," *Computer Vision, Graphics and Image Processing* 52, pp. 360-385.

Tang, Y. (2008), "Wave-equation Hessian by phase encoding," *SEG Expanded Abstracts* 27, pp. 2201-2205.

Tang, Y. (2009), "Target-oriented wave-equation least-squares migration/inversion with phase-encoded Hessian," *Geophysics* 74, pp. WCA95-WCA107.

Tang, Y. et al. (2010), "Preconditioning full waveform inversion with phase-encoded Hessian," *SEG Expanded Abstracts* 29, pp. 1034-1037.

Tsvankin, I. (2001), "Seismic Signatures and Analysis of Reflection Data in Anisotropic Media," Elsevier Science, p. 8.

Xie, X. et al. (2002), "Extracting angle domain information from migrated wavefield," *SEG Expanded Abstracts* 21, pp. 1360-1363.

Xie, X.-B. et al. (2006), "Wave-equation-based seismic illumination analysis," *Geophysics* 71(5), pp. S169-S177.

Yoon, K. et al. (2004), "Challenges in reverse-time migration," *SEG Expanded Abstracts* 23, pp. 1057-1060.

Young, J. et al. (2011), "An application of random projection to parameter estimation in partial differential equations," SIAM, 20 pgs.

Martin, G.S. et al. (2006), "Marmousi2: An elastic upgrade for Marmousi," *The Leading Edge*, pp. 156-166.

Meier, M.A. et al. (2009), "Converted wave resolution," Geophysics, 74(2):doi:10.1190/1.3074303, pp. Q1-Q16.

Moghaddam, P.P. et al. (2010), "Randomized full-waveform inversion: a dimenstionality-reduction approach," $80^{th}$ SEG Ann. Meeting, *Expanded Abstracts*, pp. 977-982.

Mora, P. (1987), "Nonlinear two-dimensional elastic inversion of multi-offset seismic data," *Geophysics* 52, pp. 1211-1228.

Nazarian, S. et al. (1983), "Use of spectral analysis of surface waves method for determination of moduli and thickness of pavement systems," *Transport Res. Record* 930, pp. 38-45.

Neelamani, R., (2008), "Simultaneous sourcing without compromise," 70th Annual Int'l. Conf. and Exh., EAGE, 5 pgs.

Neelamani, R. (2009), "Efficient seismic forward modeling using simultaneous sources and sparsity," *SEG Expanded Abstracts*, pp. 2107-2111.

Nocedal, J. et al. (2006), "*Numerical Optimization, Chapt. 7—Large-Scale Unconstrained Optimization*," Springer, New York, $2^{nd}$ pp. 165-176.

Ostmo, S. et al. (2002), "Finite-difference iterative migration by linearized waveform inversion in the frequency domain," SEG Int'l. Expo. & $72^{nd}$ Ann. Meeting, 4 pgs.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge*, pp. 60-64.

Pica, A. et al. (2005), "3D Surface-Related Multiple Modeling, Principles and Results," 2005 SEG Ann. Meeting, *SEG Expanded Abstracts* 24, pp. 2080-2083.

Plessix, R.E. et al. (2004), "Frequency-domain finite-difference amplitude preserving migration," *Geophys. J. Int.* 157, pp. 975-987.

Porter, R.P. (1989), "Generalized holography with application to inverse scattering and inverse source problems." In E. Wolf, editor, Progress in Optics XXVII, Elsevier, pp. 317-397.

Rawlinson, N. et al. (2008), "A dynamic objective function technique for generating multiple solution models in seismic tomography," *Geophys. J. Int.* 178, pp. 295-308.

Rayleigh, J.W.S. (1899), "On the transmission of light through an atmosphere containing small particles in suspension, and on the origin of the blue of the sky," *Phil. Mag.* 47, pp. 375-384.

Romero, L.A. et al. (2000), Phase encoding of shot records in prestack migration, *Geophysics* 65, pp. 426-436.

Ryden, N. et al. (2006), "Fast simulated annealing inversion of surface waves on pavement using phase-velocity spectra," *Geophysics* 71(4), pp. R49-R58.

Schuster, G.T. et al. (2010), "Theory of Multisource Crosstalk Reduction by Phase-Encoded Statics," SEG Denver 2010 Ann. Meeting, pp. 3110-3114.

Sheen, D-H. et al. (2006), "Time domain Gauss-Newton seismic waveform inversion in elastic media," Geophysics J. Int. 167, pp. 1373-1384.

Shen, P. et al. (2003), "Differential semblance velocity analysis by wave-equation migration," $73^{rd}$ Ann. Meeting of Society of Exploration Geophysicists, 4 pgs.

Sheriff, R.E.et al. (1982), "*Exploration Seismology*", pp. 134-135.

Shih, R-C. et al. (1996), "Iterative pre-stack depth migration with velocity analysis," *Terrestrial, Atmospheric & Oceanic Sciences* 7(2), pp. 149-158.

Shin, C. et al. (2001), "Waveform inversion using a logarithmic wavefield," *Geophysics* 49, pp. 592-606.

Sirgue, L. (2004), "Efficient waveform inversion and imaging: A strategy for selecting temporal frequencies," *Geophysics* 69, pp. 231-248.

Spitz, S. (2008), "Simultaneous source separation: a prediction-subtraction approach," 78th Annual Int'l. Meeting, *SEG Expanded Abstracts*, pp. 2811-2815.

Stefani, J. (2007), "Acquisition using simultaneous sources," 69th Annual Conf. and Exh., *EAGE Extended Abstracts*, 5 pgs.

(56) References Cited

OTHER PUBLICATIONS

Symes, W.W. (2007), Reverse time migration with optimal checkpointing, *Geophysics* 72(5), pp. P.SM213-SM221.
Tarantola, A. (1984), "Inversion of seismic reflection data in the acoustic approximation," *Geophysics* 49, pp. 1259-1266.
Tarantola, A. (1986), "A strategy for nonlinear elastic inversion of seismic reflection data," *Geophysics* 51(10), pp. 1893-1903.
Tarantola, A. (1988), "Theoretical background for the inversion of seismic waveforms, including elasticity and attenuation," *Pure and Applied Geophysics* 128, pp. 365-399.
Tarantola, A. (2005), "Inverse Problem Theory and Methods for Model Parameter Estimation," *SIAM*, pp. 79.
Trantham, E.C. (1994), "Controlled-phase acquisition and processing," *SEG Expanded Abstracts* 13, pp. 890-894.
van Groenestijn, G.J.A. et al. (2009), "Estimating primaries by sparse inversion and application to near-offset reconstruction," *Geophyhsics* 74(3), pp. A23-A28.
van Manen, D.J. (2005), "Making wave by time reversal," SEG International Exposition and $75^{th}$ Annual Meeting, *Expanded Abstracts*, pp. 1763-1766.
Verschuur, D.J. (2009), Target-oriented, least-squares imaging of blended data, 79th Annual Int'l. Meeting, *SEG Expanded Abstracts*, pp. 2889-2893.
Verschuur, D.J. et al. (1992), "Adaptive surface-related multiple elimination," *Geophysics* 57(9), pp. 1166-1177.
Verschuur, D.J. et al. (1989), "Wavelet Estimation by Prestack Multiple Elimination," *SEG Expanded Abstracts* 8, pp. 1129-1132.
Vigh, D. et al. (2008), "3D prestack plane-wave, full-waveform inversion," *Geophysics* 73(5), pp. VE135-VE144.
Wang, Y. (2007), "Multiple prediction through inversion: Theoretical advancements and real data application," *Geophysics* 72(2), pp. V33-V39.
Wang, K. et al. (2009), "Simultaneous full-waveform inversion for source wavelet and earth model," SEG Int'l. Expo. & Ann. Meeting, *Expanded Abstracts*, pp. 2537-2541.
Weglein, A.B. (2003), "Inverse scattering series and seismic exploration," *Inverse Problems* 19, pp. R27-R83.
Wu, R-S. et al. (2006), "Directional illumination analysis using beamlet decomposition and propagation," *Geophysics* 71(4), pp. S147-S159.
Xia, J. et al. (2004), "Utilization of high-frequency Rayleigh waves in near-surface geophysics," *The Leading Edge*, pp. 753-759.
Zhang, Y. (2005), "Delayed-shot 3D depth migration," *Geophysics* 70, pp. E21-E28.
Ziolkowski, A. (1991), "Why don't we measure seismic signatures?," *Geophysics* 56(2), pp. 190-201.
Boonyasiriwat, C. et al. (2010), 3D Multisource Full-Waveform using Dynamic Random Phase Encoding, SEG Denver 2010 Annual Meeting, pp. 1044-1049.
Boonyasiriwat, C. et al. (2010), 3D Multisource Full-Waveform using Dynamic Random Phase Encoding, SEG Denver 2010 Annual Meeting, pp. 3120-3124.
Bunks, C., et al. (1995), "Multiscale seismic waveform inversion," *Geophysics* 60, pp. 1457-1473.
Burstedde, G. et al. (2009), "Algorithmic strategies for full waveform inversion: 1D experiments," *Geophysics* 74(6), pp. WCC17-WCC46.
Chavent, G. et al. (1999), "An optimal true-amplitude least-squares prestack depth-migration operator," *Geophysics* 64(2), pp. 508-515.
Clapp, R.G. (2009), "Reverse time migration with random boundaries," SEG International Exposition and Meeting, *Expanded Abstracts*, pp. 2809-2813.
Dai, W. et al. (2010), "3D Multi-source Least-squares Reverse Time Migration," SEG Denver 2010 Annual Meeting, pp. 3120-3124.
Delprat-Jannuad, F. et al. (2005), "A fundamental limitation for the reconstruction of impedance profiles from seismic data," *Geophysics* 70(1), pp. R1-R14.
Dunkin, J.w. et al. (1973), "Effect of Normal Moveout on a Seismic Pluse," *Geophysics* 38(4), pp. 635-642.
Dziewonski A. et al. (1981), "Preliminary Reference Earth Model", *Phys. Earth Planet. Int.* 25(4), pp. 297-356.

Ernst, F.E. et al. (2000), "Tomography of dispersive media," *J. Acoust. Soc. Am* 108(1), pp. 105-116.
Ernst, F.E. et al. (2002), "Removal of scattered guided waves from seismic data," *Geophysics* 67(4), pp. 1240-1248.
Esmersoy, C. (1990), "Inversion of P and SV waves from multicomponent offset vertical seismic profiles", *Geophysics* 55(1), pp. 39-50.
Fallat, M.R. et al. (1999), "Geoacoustic inversion via local, global, and hybrid algorithms," *Journal of the Acoustical Society of America* 105, pp. 3219-3230.
Fichtner, A. et al. (2006), "The adjoint method in seismology I. Theory," *Physics of the Earth and Planetary Interiors* 157, pp. 86-104.
Forbriger, T. (2003), "Inversion of shallow-seismic wavefields: I. Wavefield transformation," *Geophys. J. Int.* 153, pp. 719-734.
Gibson, B. et al. (1984), "Predictive deconvolution and the zero-phase source," *Geophysics* 49(4), pp. 379-397.
Griewank, A. (1992), "Achieving logarithmic growth of temporal and spatial complexity in reverse automatic differentiation," 1 *Optimization Methods and Software*, pp. 35-54.
Griewank, A. (2000), Evaluating Derivatives: Principles and Techniques of Algorithmic Differentiation, Society for Industrial and Applied Mathematics, 49 pgs.
Griewank, A. et al. (2000), "Algorithm 799: An implementation of checkpointing for the reverse or adjoint mode of computational differentiation," 26 *ACM Transactions on Mathematical Software*, pp. 19-45.
Griewank, A. et al. (1996), "Algorithm 755: A package for the automatic differentiation of algorithms written in C/C++," *ACM Transactions on Mathematical Software* 22(2), pp. 131-167.
Haber, E. et al. (2010), "An effective method for parameter estimation with PDE constraints with multiple right hand sides," Preprint—UBC http://www.math.ubc.ca/~haber/pubs/PdeOptStochV5.pdf.
Herrmann, F.J. (2010), "Randomized dimensionality reduction for full-waveform inversion," *EAGE abstract* G001, EAGE Barcelona meeting, 5 pgs.
Holschneider, J. et al. (2005), "Characterization of dispersive surface waves using continuous wavelet transforms," *Geophys. J. Int.* 163, pp. 463-478.
Igel, H. et al. (1996), "Waveform inversion of marine reflection seismograms for P impedance and Poisson's ratio," *Geophys. J. Int.* 124, pp. 363-371.
Ikelle, L.T. (2007), "Coding and decoding: Seismic data modeling, acquisition, and processing," 77th Annual Int'l. Meeting, SEG Expanded Abstracts, pp. 66-70.
Jackson, D.R. et al. (1991), "Phase conjugation in underwater acoustics," *J. Acoust. Soc. Am.* 89(1), pp. 171-181.
Jing, X. et al. (2000), "Encoding multiple shot gathers in prestack migration," *SEG International Exposition and $70^{th}$ Annual Meeting Expanded Abstracts*, pp. 786-789.
Kennett, B.L.N. (1991), "The removal of free surface interactions from three-component seismograms", *Geophys. J. Int.* 104, pp. 153-163.
Krebs, J.R. (2008), "Fast Full-wavefield seismic inversion using encoded sources," *Geophysics* 74(6), pp. WCC177-WCC188.
Krohn, C.E. (1984), "Geophone ground coupling," *Geophysics* 49(6), pp. 722-731.
Kroode, F.T. et al. (2009), "Wave Equation Based Model Building and Imaging in Complex Settings," OTC 20215, 2009 Offshore Technology Conf., Houston, TX, May 4-7, 2009, 8 pgs.
Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.
Lancaster, S. et al. (2000), "Fast-track 'colored' inversion," $70^{th}$ SEG Ann. Meeting, *Expanded Abstracts*, pp. 1572-1575.
Lazaratos, S. (2006), "Spectral Shaping Inversion for Elastic and Rock Property Estimation," *Research Disclosure*, Issue 511, pp. 1453-1455.
Lecomte, I. (2008), "Resolution and illumination analyses in PSDM: A ray-based approach," The Leading Edge, pp. 650-663.
Lee, S. et al. (2010), "Subsurface parameter estimation in full wavefield inversion and reverse time migration," SEG Denver 2010 Annual Meeting, pp. 1065-1069.

(56) References Cited

OTHER PUBLICATIONS

Levanon, N. (1988), "Radar Principles," Chpt. 1, John Whiley & Sons, New York, pp. 1-18.

Liao, Q. et al. (1995), "2.5D full-wavefield viscoacoustic inversion," *Geophysical Prospecting* 43, pp. 1043-1059.

Maharramov, M. et al. (2007), "Localized image-difference wave-equation tomography," SEG Annual Meeting, *Expanded Abstracts*, pp. 3009-3013.

Malmedy, V. et al. (2009), "Approximating Hessians in unconstrained optimization arising from discretized problems," *Computational Optimization and Applications*, pp. 1-16.

Marcinkovich, C. et al. (2003), "On the implementation of perfectly matched layers in a three-dimensional fourth-order velocity-stress finite difference scheme," *J. of Geophysical Research* 108(B5), 2276.

Abt, D.L. et al. (2010), "North American lithospheric discontinuity structured imaged by Ps and Sp receiver functions", *J Geophys. Res.*, 24 pgs.

Akerberg, P., et al. (2008), "Simultaneous source separation by sparse radon transform," 78th SEG Annual International Meeting, *Expanded Abstracts*, pp. 2801-2805.

Aki, K. et al. (1980), "Quantitative Seismology: Theory and Methods vol. I—Chapter 7—Surface Waves in a Vertically Heterogenous Medium," W.H. Freeman and Co., pp. 259-318.

U.S. Appl. No. 13/224,005, filed Sep. 1, 2011, Routh et al.

Aki, K. et al. (1980), "Quantitative Seismology: Theory and Methods vol. I," W.H. Freeman and Co., p. 173.

Baumstein, A. et al. (2009), "Scaling of the Objective Function Gradient for Full Wavefield Inversion," SEG Houston 2009 Int'l. Expo and Annual Meeting, pp. 22432247.

Beasley, C. (2008), "A new look at marine simultaneous sources," *The Leading Edge* 27(7), pp. 914-917.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," SEG Int'l. Exposition and 72th Annl. Mtg., 4 pgs.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

Ben-Hadj-Ali, H. et al. (2009), "Three-dimensional frequency-domain full waveform inversion with phase encoding," *SEG Expanded Abstracts*, pp. 2288-2292.

Beylkin, G. (1985), "Imaging of discontinuities in the inverse scattring problem by inversion of a causal generalized Radon transform," *J. Math. Phys.* 26, pp. 99-108.

Bonomi, E. et al. (2006), "Wavefield Migration plus Monte Carlo Imaging of 3D Prestack Seismic Data," *Geophysical Prospecting* 54, pp. 505-514.

\* cited by examiner

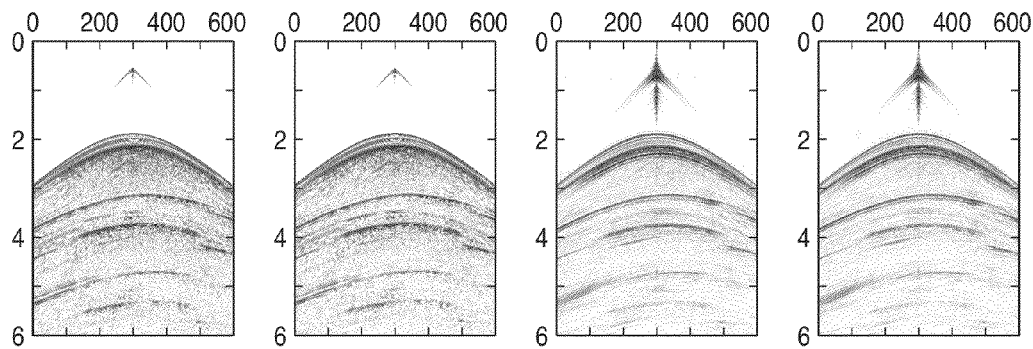
FIG. 11A  FIG. 11B  FIG. 11C  FIG. 11D
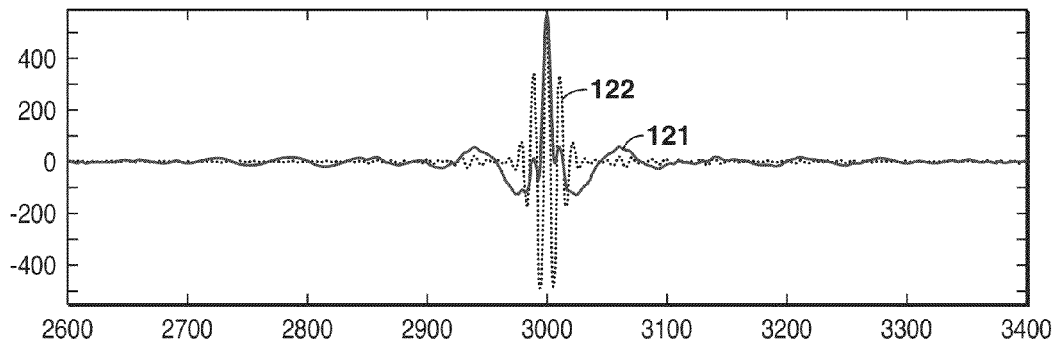
FIG. 12

CONVERGENCE RATE OF FULL WAVEFIELD INVERSION USING SPECTRAL SHAPING

CROSS-REFERENCE TO RELATED APPLICATION

This application claims priority from both U.S. Provisional Patent Application No. 61/469,478 filed on Mar. 30, 2011, entitled Improving Convergence Rate of Full Wavefield Inversion Using Spectral Shaping and U.S. Provisional Patent Application No. 61/508,440 filed on Jul. 15, 2011, entitled Convergence Rate of Full Wavefield Inversion Using Spectral Shaping, both of which are incorporated by reference herein in their entirety.

FIELD OF THE INVENTION

This invention relates generally to the field of geophysical prospecting and, more particularly to inversion of seismic data, a broad term used to signify a process of building a model of the subsurface based on recorded seismic data. Specifically, the invention is a method for improving the convergence rate of full wavefield inversion using spectral shaping. The term Full Wavefield Inversion ("FWI") is used to signify a type of inversion method aimed at generating subsurface models that can fully explain the recorded seismic data in an exact quantitative sense: accurate simulation of synthetic seismic data based on the subsurface model that is the result of the inversion should closely match the real seismic data.

BACKGROUND OF THE INVENTION

Geophysical inversion attempts to find a model of subsurface properties that optimally explains observed data and satisfies geological and geophysical constraints. There are a large number of well known methods of geophysical inversion. These well known methods fall into one of two categories, iterative inversion and non-iterative inversion. The following are definitions of what is commonly meant by each of the two categories:

Non-iterative inversion—inversion that is accomplished by assuming some simple background model and updating the model based on the input data. This method does not use the updated model as input to another step of inversion. For the case of seismic data these methods are commonly referred to as imaging, migration, diffraction tomography or Born inversion.

Iterative inversion—inversion involving repetitious improvement of the subsurface properties model such that a model is found that satisfactorily explains the observed data. If the inversion converges, then the final model will better explain the observed data and will more closely approximate the actual subsurface properties. Iterative inversion usually produces a more accurate model than non-iterative inversion, but is much more expensive to compute.

The most common iterative inversion method employed in geophysics is cost function optimization. Cost function optimization involves iterative minimization or maximization of the value, with respect to the model M, of a cost function S(M) which is a measure of the misfit between the calculated and observed data (this is also sometimes referred to as the objective function), where the calculated data are simulated with a computer using the current geophysical properties model and the physics governing propagation of the source signal in a medium represented by a given geophysical properties model. The simulation computations may be done by any of several numerical methods including but not limited to finite difference, finite element or ray tracing. The simulation computations can be performed in either the frequency or time domain.

Cost function optimization methods are either local or global. Global methods simply involve computing the cost function S(M) for a population of models $\{M_1, M_2, M_3, \ldots\}$ and selecting a set of one or more models from that population that approximately minimize S(M). If further improvement is desired this new selected set of models can then be used as a basis to generate a new population of models that can be again tested relative to the cost function S(M). For global methods each model in the test population can be considered to be an iteration, or at a higher level each set of populations tested can be considered an iteration. Well known global inversion methods include Monte Carlo, simulated annealing, genetic and evolution algorithms.

Unfortunately global optimization methods typically converge extremely slowly and therefore most geophysical inversions are based on local cost function optimization. Algorithm 1 summarizes local cost function optimization.

1. selecting a starting model,
2. computing the gradient of the cost function S(M) with respect to the parameters that describe the model,
3. searching for an updated model that is a perturbation of the starting model in the negative gradient direction that better explains the observed data.

Algorithm 1—Algorithm for Performing Local Cost Function Optimization.

This procedure is iterated by using the new updated model as the starting model for another gradient search. The process continues until an updated model is found that satisfactorily explains the observed data. Commonly used local cost function inversion methods include gradient search, conjugate gradients and Newton's method.

A very common cost function is the sum of the squared differences (L2 norm) of real and simulated seismic traces. For such a case, the gradient is calculated through a cross-correlation of two wavefields, as shown for the typical full wavefield inversion workflow in FIG. 1. Starting with an estimate of the source wavelet (101), and an initial subsurface model (102), we generate simulated seismic data (103) by propagating waves forward (104) from the source to the receiver locations. The data residuals (105) are formed by subtracting (110) the simulated data from the real seismic data (106). These residuals are then propagated backwards to the subsurface model (107) and cross-correlated with the source wavefield, generated by forward propagation (108) from the source location to the subsurface. The result of this cross-correlation is the gradient (109), on the basis of which the subsurface model is updated. The process is repeated with the new updated model, until the difference between simulated and real seismic data becomes acceptable.

For different cost functions the calculation of the gradient can be different. Still the basic elements of the workflow in FIG. 1 are quite general. The key ideas for the present invention can be trivially modified for cases where alternative cost functions and gradient computations are used.

Iterative inversion is generally preferred over non-iterative inversion, because it yields more accurate subsurface parameter models. Unfortunately, iterative inversion is so computationally expensive that it is impractical to apply it to many problems of interest. This high computational expense is the result of the fact that all inversion techniques require many compute intensive simulations. The compute time of any individual simulation is proportional to the number of sources to be inverted, and typically there are large numbers of sources in geophysical data, where the term source as used in the preceding refers to an activation location of a source apparatus. The problem is exacerbated for iterative inversion, because the number of simulations that must be computed is proportional to the number of iterations in the inversion, and the number of iterations required is typically on the order of hundreds to thousands.

Reducing the computational cost of full wavefield inversion is a key requirement for making the method practical for field-scale 3D applications, particularly when high-resolution is required (e.g. for reservoir characterization). A large number of proposed methods rely on the idea of simultaneously simulated sources, either encoded (e.g. Krebs et al., 2009; Ben-Hadj-Ali et al., 2009; Moghaddam and Herrmann, 2010) or coherently summed (e.g. Berkhout, 1992; Zhang et al., 2005, Van Riel and Hendrik, 2005). Inversion methods based on encoded simultaneous simulation often suffer from cross-talk noise contaminating the inversion result and are commonly limited by the data acquisition configuration (recording data with stationary receivers is a requirement for several of the methods). Methods based on coherent summation typically lead to loss of information. Nevertheless both types of approaches can be very helpful and are the subject of ongoing research.

A different way for reducing the computational cost of full wavefield inversion is by reducing the number of iterations required for convergence, and this is the objective of this invention. The method does not suffer from the typical limitations of the methods mentioned above, but it does not preclude their usage. In fact, it can, in principle, be used in combination with any of the simultaneous-source methods mentioned above, to potentially provide increased computational savings.

SUMMARY OF THE INVENTION

In one embodiment, the invention is a computer-implemented method for accelerating convergence of iterative inversion of seismic data to obtain a model of one or more physical parameters in a subsurface region, comprising using local cost function optimization, wherein an assumed or current model is updated to reduce misfit between the seismic data and model-simulated data, wherein the frequency spectrum of the updated model is controlled in a first iteration and thereafter to match a known or estimated frequency spectrum for the subsurface region.

BRIEF DESCRIPTION OF THE DRAWINGS

The present invention and its advantages will be better understood by referring to the following detailed description and the attached drawings in which:

FIGS. 11A-11D show a synthetic example of a measured shot gather and a simulated shot gather, before and after spectral shaping by the present inventive method; and FIG. 12 shows the effect on a cross-correlation cost function of the spectral shaping from FIGS. 11A-11D.

Figure 1:
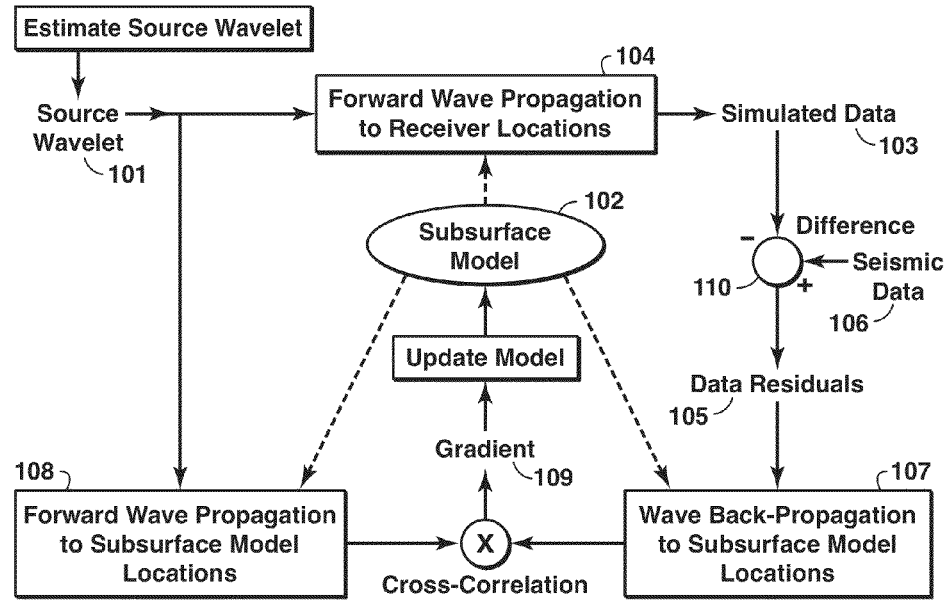
FIG. 1 is a flowchart showing basic steps in full wavefield inversion.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. Persons skilled in the technical field will readily recognize that in practical applications of the present inventive method, the method must be performed on a computer programmed in accordance with the teachings herein.

DETAILED DESCRIPTION OF EXAMPLE EMBODIMENTS

A key idea behind the present inventive method is based on the assumption that a reasonable estimate of the frequency spectrum of the subsurface is known a-priori. If this is the case, the number of iterations required for convergence can be significantly reduced by guaranteeing that the inversion generates subsurface models with the desired frequency spectrum from the very first iteration. Intuitively it can be seen that this implies that computational effort does not need to be spent on iterations that mostly modify the spectrum of the subsurface model, and consequently the inversion converges to a final answer at a faster rate.

For this idea to be meaningful and practical, the following questions must be answered:
(1) Can it typically be assumed that good estimates of the frequency spectrum of the subsurface are available?
(2) How can it be guaranteed that the inversion results have the desired frequency spectrum, and, in particular, how can this be achieved this from the very first iteration?

The answers to these two questions are provided in the following two sections.

Estimating Frequency Spectrum of Subsurface Models

In papers on non-iterative inversion, Lancaster and Whitcombe (2000), Lazaratos (2006), Lazaratos and David (2008), and Lazaratos and David (2009) introduced the idea that the model generated by the non-iterative inversion should have a frequency spectrum that, on average, is similar to the spectrum of the earth's subsurface, as measured by well logs. (The terms amplitude spectrum and frequency spectrum may be used interchangeably herein to refer to amplitude versus frequency.) For any given area, this target spectrum can be derived by averaging the spectra of log curves recorded in local wells. Theoretically, the appropriate log curve to be used for normal-incidence reflection data is the P-impedance. In practice, it has been observed that the average spectra for most log curves are fairly similar. In fact, typical well-log spectra are fairly similar for a very large variety of geographic locations, depths and depositional environments, so that the general form of inversion target spectra is robust and well-defined. Because of the stability and robustness of well log spectra, the concept outlined in the aforementioned publications is widely used for non-iterative seismic inversion, even when local well control is not available.

Controlling the Frequency Spectrum of the Inversion Results

In general there are several parameters that characterize the subsurface that can be estimated with seismic inversion (e.g. P-impedance, S-impedance, density, P-velocity etc). The frequency spectra for these different parameters can, in principle, be different. So, when one refers to the frequency spectrum of a subsurface model, the parameter being referred to needs to be specified. The single-parameter inversion case is addressed first, where the subsurface model is described in terms of compressional (P) impedance (impedance is the product of velocity and density) only. This is a common application of inversion, since subsurface reflectivity mostly depends on variations of P-impedance. We then describe how the approach can be extended to multi-parameter inversion.

The frequency spectrum of the inversion results is related to the frequency spectrum of the seismic data and that of the source wavelet. In particular, for seismic reflection data, the convolutional model states that the seismic reflection response of a given subsurface can be calculated through the convolution of the seismic wavelet and the reflectivity of the earth. Assuming weak scattering, it can be shown that, for normal incidence, the reflectivity function can be simply calculated as the derivative of the P-impedance. For oblique incidence the calculation of reflectivity involves additional elastic parameters, but this does not fundamentally change the concept for the method presented here. In the frequency domain, the basic formula describing the convolutional model is:

$$D(f) = f I_p(f) W(f). \quad (1)$$

where f is frequency, D(f) is the average amplitude spectrum of the seismic data, W(f) the amplitude spectrum of the seismic wavelet and $I_p(f)$ the average amplitude spectrum of the subsurface P-impedance. Calculating the derivative of P-impedance in the time domain corresponds to multiplication by $i2\pi f$ in the frequency domain. For the present discussion, the $2\pi$ factor is omitted for simplicity, since it does not impact the conclusions or the implementation of the method. The factor i is also omitted since we will deal only with the amplitude spectrum.

The implication of what was just discussed is that, in order for the final inversion result to have a frequency spectrum $I_p(f)$, it is necessary to use a wavelet whose spectrum W(f) is related to the data spectrum D(f) by equation (1). Although equation (1) is theoretically valid only when the amplitude spectrum in the equation is for the particular parameter, P-impedance, it has been empirically observed that the spectra of different elastic parameters are typically quite similar. Described next is how the inversion problem can be reformulated such that the inversion generates a model with spectrum $I_p(f)$ from the very first iteration.

The model update in FWI is typically calculated as a scaled version of the gradient of the objective function with respect to the model parameter(s). For the usual L2 (least-squares) objective function, the gradient may be calculated by cross-correlating the forward-propagated source wavefield and the back-propagated residual wavefield. The spectrum of the forward-propagated source wavefield is proportional to the spectrum of the input wavelet W(f). For the first iteration, given that typical inversion starting models are very smooth and do not generate reflections, the data residuals are essentially equal to the recorded data, and therefore the spectrum of the back-propagated data residual wavefield is proportional to D(f). Therefore, the spectrum of the gradient G(f) is equal to the product of the spectra of the two cross-correlated wavefields (W(f) and D(f)), further multiplied with a frequency-dependent factor A(f) that depends on the specifics of the inversion problem being solved (e.g., 2D vs. 3D, acoustic vs. elastic inversion, elastic parameter being updated, etc). This factor can be derived either theoretically (e.g., for 2D constant-density acoustic inversions $A(f) = f^{1/2}$), or experimentally by calculating the spectrum of the gradient and comparing it to the product of the known spectra W(f) and D(f). So we can write:

$$G(f) = A(f) W(f) D(f). \quad (2)$$

Let us assume that the spectrum of the earth's impedance $I_p(f)$ is known a-priori and that we would like to have $G(f) = I_p(f)$. This will not be true in general. Still, we can appropriately transform the original inversion problem to a new one by applying a shaping filter H(f) to both the input wavelet and the data. The new shaped wavelet $W_s(f)$ and the shaped data $D_s(f)$ are related to the original wavelet and data spectra through the following:

$$W_s(f) = H(f) W(f).$$

$$D_s(f) = H(f) D(f) \quad (3)$$

Inverting for a model that matches the original data D(f) using a wavelet W(f) is equivalent to inverting for a model that matches the shaped data $D_s(f)$ using the shaped wavelet $W_s(f)$. Similar to equation (2), we now write for the shaped gradient $G_s(f)$:

$$\begin{aligned} G_s(f) &= A(f) W_s(f) D_s(f) \\ &= f A(f) H^2(f) W^2(f) I_p(f) \\ &= \frac{A(f) H^2(f) D^2(f)}{f I_p(f)}. \end{aligned} \quad (4)$$

We now determine H(f) such that $$G_s(f) = I_p(f). \quad (5)$$

and using equation (4) we get:

$$H(f) = \frac{1}{f^{1/2} A^{1/2}(f) W(f)} = \frac{f^{1/2} I_p(f)}{A^{1/2}(f) D(f)}. \quad (6)$$

Using the last equation, we get the following expressions for the shaped wavelet and data spectra:

$$W_s(f) = \frac{1}{f^{1/2} A^{1/2}(f)} \quad (7)$$

$$D_s(f) = \frac{f^{1/2}}{A^{1/2}(f)} I_p(f).$$

Figure 2:
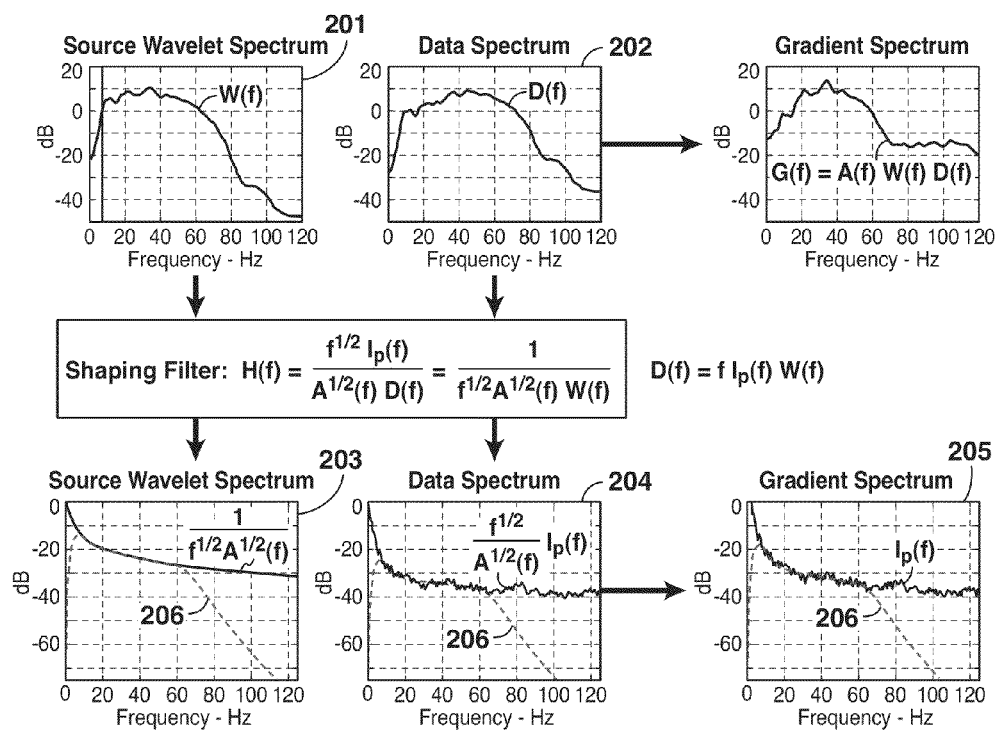
FIG. 2 is a schematic illustration of the effect of the application of a shaping filter of the present invention to the source wavelet and seismic data.

The effect of the application of the shaping filter is shown schematically in FIG. 2, where the frequency spectrum of the shaping filter is 206. The original inversion problem (wavelet W(f) (201) and data D(f) (202)) is transformed into a new one (wavelet $W_s(f)$ (203) and data $D_s(f)$ (204)), such that the gradient (205) has the desired spectrum $I_p(f)$.

The above discussion is valid even for the case where a larger range of reflection angles (not just normal incidence) is included in the inversion. The only conceptual modification occurs in equation (2), where the factor A(f) will now incorporate the effect of NMO stretch on the wavelet (Dunkin and Levin, 1973).

Invention Embodiments

Application of Spectral Shaping Filter to Input Data and Source Wavelet

Figure 3:
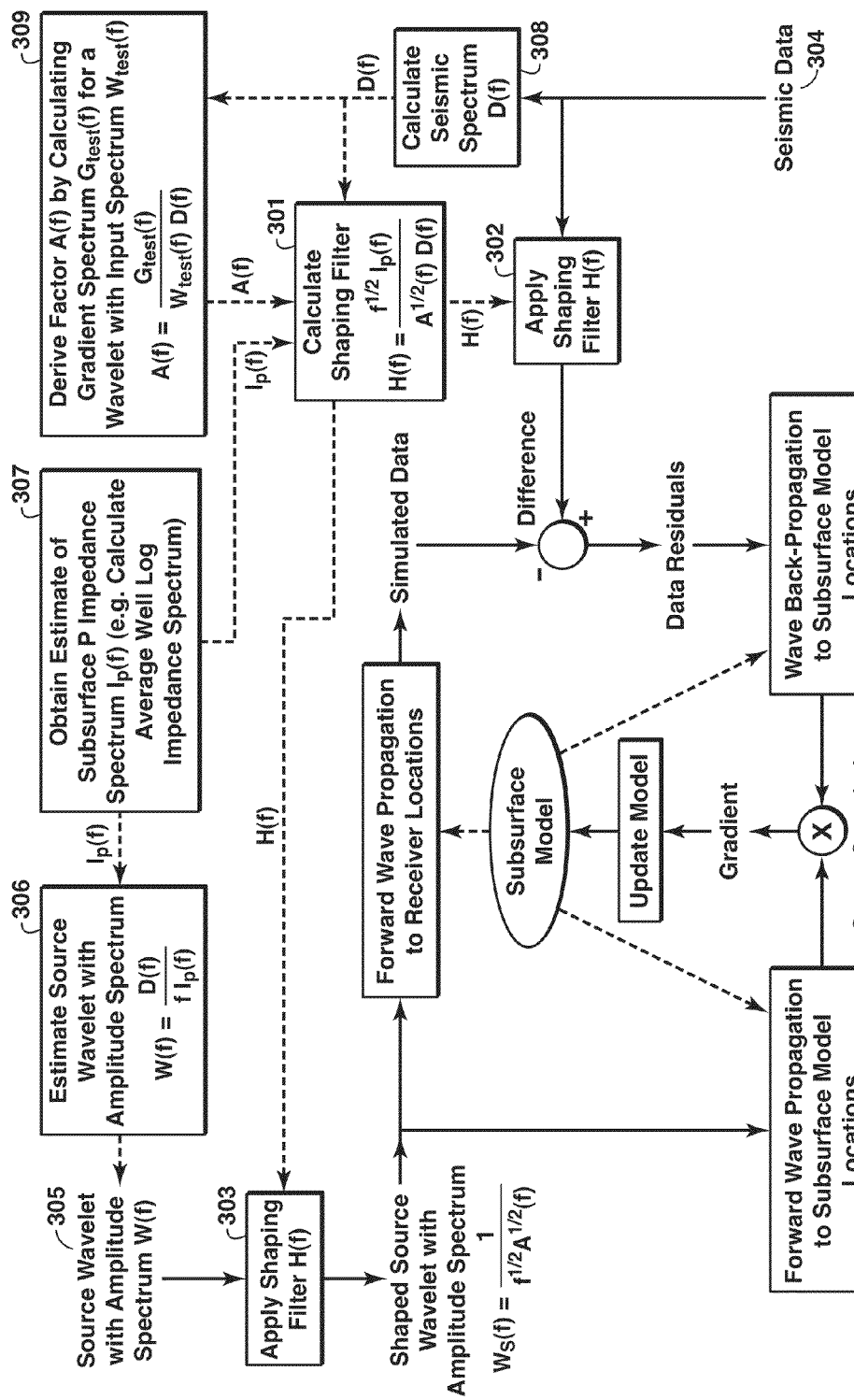
FIG. 3 is a flowchart showing basic steps in an embodiment of the present inventive method involving application of a spectral-shaping filter to the input data and source wavelet.

As explained in the previous section, the method can be implemented by applying an appropriate spectral shaping filter to the seismic data and the source wavelet, without otherwise modifying the inversion workflow that is shown in FIG. 1. FIG. 3 is a flowchart describing this embodiment of the method. A shaping filter H(f) (301) is applied (302 and 303) to the seismic data (304) and the source wavelet (305). The source wavelet needs to be selected (306) such that its amplitude spectrum W(f), the spectrum of the seismic data D(f) and the spectrum of the subsurface P impedance model $I_p(f)$ are linked through equation (1). For the calculation of the shaping filter, in addition to obtaining an a-priori estimate $I_p(f)$ (307) of the subsurface impedance spectrum, we need to calculate (308) the seismic spectrum D(f) and the factor A(f) (309). The latter can be derived conveniently by calculating the spectrum of the gradient $G_{test}(f)$ for a given input wavelet $W_{test}(f)$, and then setting A(f) equal to the ratio of $G_{test}(f)$ and the product $W_{test}(f)D(f)$.

Application of Spectral Shaping Filter to the Gradient

Instead of applying the shaping filter to the seismic data and the source wavelet, we can shape the spectrum of the gradient, such that it becomes similar to the a-priori estimate $I_p(f)$. This is shown schematically with the flowchart of FIG. 4. The shaping filter $H_G(f)$ is now applied directly to the gradient (401). The filter $H_G(f)$ can be derived (403) by dividing the desired spectrum $I_p(f)$ by the unshaped gradient spectrum G(f). The source wavelet needs to be selected (402) such that its amplitude spectrum W(f), the spectrum of the seismic data D(f) and the spectrum of the subsurface P impedance model $I_p(f)$ are linked through equation (1) of the previous section.

This embodiment of the invention is particularly flexible, allowing for the easy application of a time-variable filter $H_G(f)$: because the spectrum of the seismic data changes with time, one can expect that the spectrum of the gradient G(f) will also be changing; hence, to shape to the same target spectrum $I_p(f)$, the filter $H_G(f)$ will need to be time-variable. Although this can be easily accomplished when we apply the shaping filter directly to the gradient, it is not straightforward to handle with the first embodiment described above (shaping filter applied to the data and the source wavelet). On the other hand, the first embodiment is safer to apply when the data contain a substantial amount of wave modes other than primary reflections.

Figure 4:
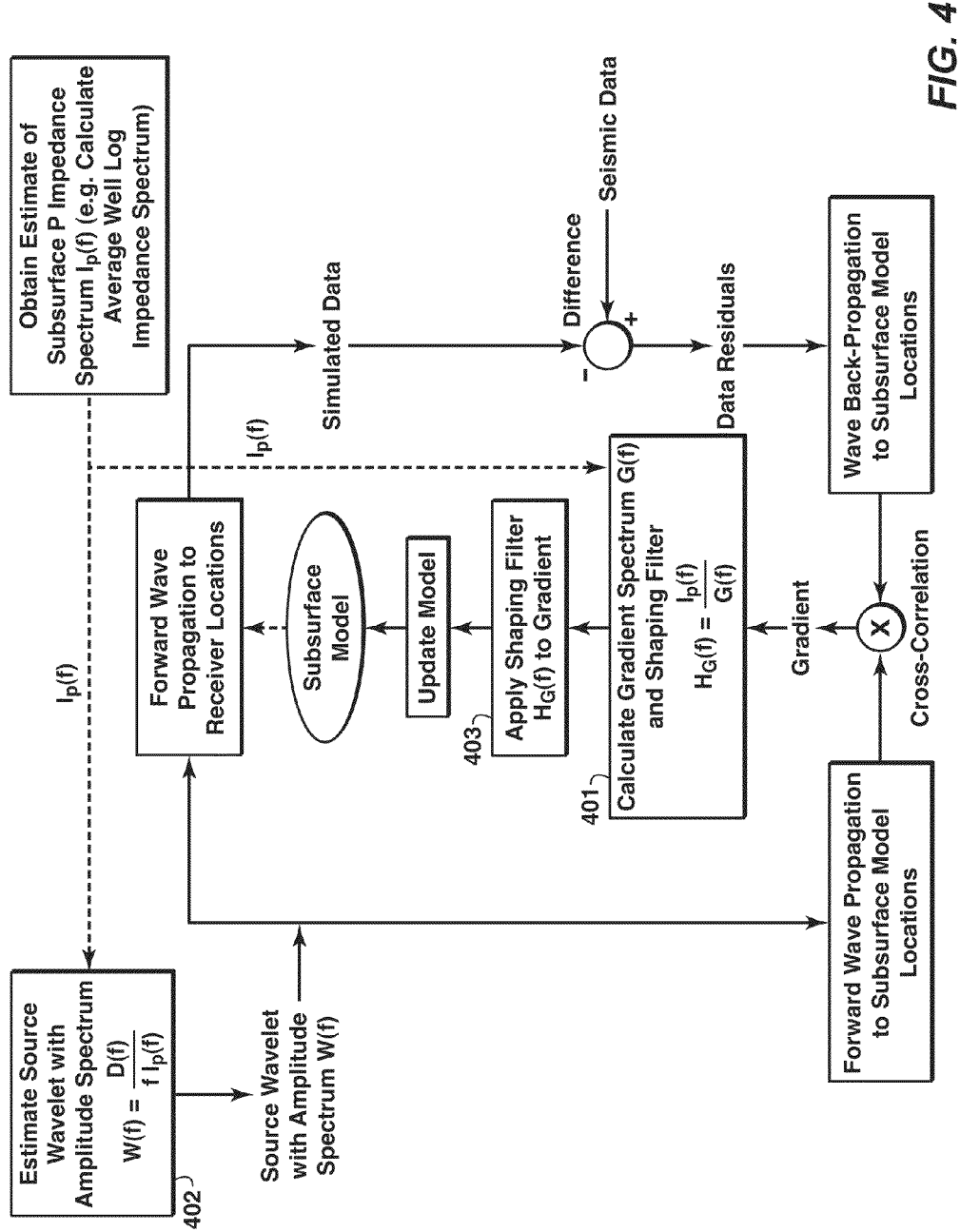
FIG. 4 is a flowchart showing basic steps of an embodiment of the present inventive method involving application of a spectral-shaping filter to the gradient of the cost function.

It should also be noted that the embodiment of FIG. 4 is applicable to obtaining any elastic parameter, not just P-impedance, merely by substituting, for $I_p(f)$ in the shaping filter formula in step 401, the amplitude spectrum corresponding to the other elastic parameter. That is not true for the embodiment of FIG. 3, which is valid only for P-impedance.

Extension to Multi-Parameter Inversion

Figure 5:
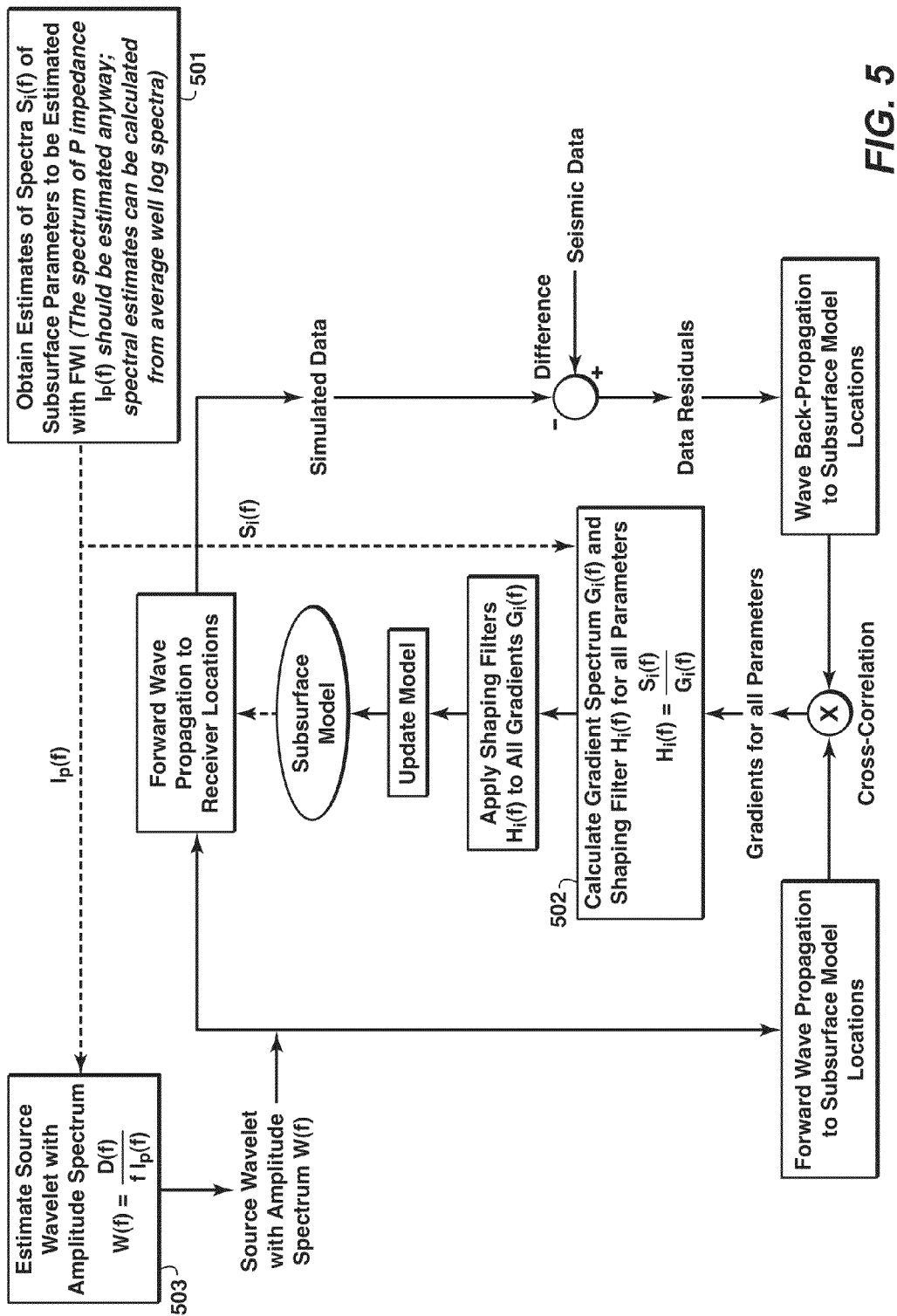
FIG. 5 is a flowchart showing basic steps of the embodiment of FIG. 4 extended for the multi-parameter inversion case.

The method can be extended in a straightforward way for the case of multi-parameter inversion, when several subsurface parameters, in addition to P impedance, are being estimated. A corresponding flowchart is shown in FIG. 5. Assuming estimates $S_i(f)$ of the amplitude spectra of the different subsurface parameters (501) (e.g. from average well log spectra) can be obtained, the spectra of the gradients $G_i(f)$ with respect to the different parameters can be shaped using shaping filters $H_i(f)$, derived by dividing the desired spectra $S_i(f)$ by the unshaped gradient spectra $G_i(f)$ (502).

Notice that, again, the source wavelet needs to be selected (503) such that its amplitude spectrum W(f), the spectrum of the seismic data D(f) and the spectrum of the subsurface P impedance model $I_p(f)$ are linked through equation (1). Because of this, an a-priori estimate of $I_p(f)$ is necessary, whether or not obtaining an estimate of P impedance is an objective of the inversion, except in embodiments of the invention where spectral differences between different elastic parameters are considered negligible.

Comparison to Non-Iterative Inversion Methods

For the non-iterative inversion methods in the references above (Lancaster and Whitcombe (2000), Lazaratos (2006), Lazaratos and David (2008), and Lazaratos and David (2009)) no forward simulation is taking place, so there is no need to estimate a source wavelet. The means of controlling the final spectrum in these prior methods is to shape the spectrum of the answer so that it has the desired spectrum. The non-iterative inversion methods assume that input data are or will be migrated and stacked, and that, after migration and stacking, they can be modeled by the convolutional model (stating that the seismic response can be found by convolving the wavelet with the earth's reflectivity, which is the derivative of impedance). Assuming this is true, the earth's impedance can be derived by the application of a shaping filter to the result of migration and stacking. The mathematical derivation of why this shaping filter should indeed recover impedance from the data is included in Lazaratos (2006) and in Lazaratos and David (2008). In the latter reference, the point is made that the shaping filter is optimally applied before migration. The methodology can be extended to inversion for other parameters, and that is explained in Lazaratos (2006). Thus, traditional non-iterative inversion is not the same thing as completing one cycle of an iterative inversion process, and then stopping.

For iterative inversion using the present inventive method, the means for controlling the final spectrum is by choosing a source wavelet spectrum W(f) that fulfills equation (1). But even if we control the final spectrum by the choice of wavelet W(f), this does not guarantee that we control the spectrum for every iteration, beginning with the first. To do that, we need to apply the rest of the inventive method as disclosed herein, including the spectral-shaping filter. Until that happens, there will be no overall reduction in the number of iterations, and no computational speed-up, which (i.e., the speed-up) is a key advantage of the present invention for iterative inversion. Therefore, preferably the full method is applied beginning with the first iteration.

For the embodiment of FIG. 3, the shaping filter is applied to the wavelet and the data once and does not need to be re-applied. The embodiment of FIG. 4 provides more flexibility and, in principle, may benefit from application at every iteration. The shaping filter in that drawing is defined as the ratio of the desired spectrum to the current G(f). This ratio is going to be different from unity in the first iteration, and reapplying the shaping filter as indicated in FIG. 4 will correct for that. If the spectrum of the update should remain constant after that, the shaping filter will have no effect because $H_G(f)$ becomes the identity operator. But if the update G(f) deviates from the target (Ip(f) for the case of P-impedance), the filter will be adjusted to correct for it.

EXAMPLES

Figure 6:
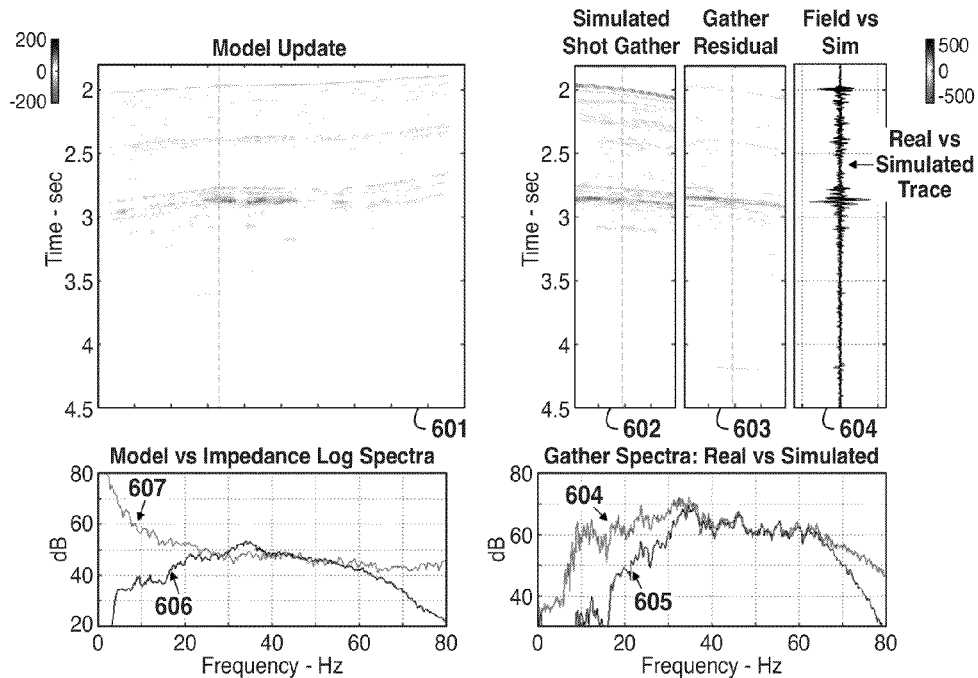
FIGS. 6-8 illustrate convergence of full wavefield inversion ("FWI") after 10 iterations (FIG. 6), 50 iterations (FIG. 7), and 100 iterations (FIG. 8)
Figure 7:
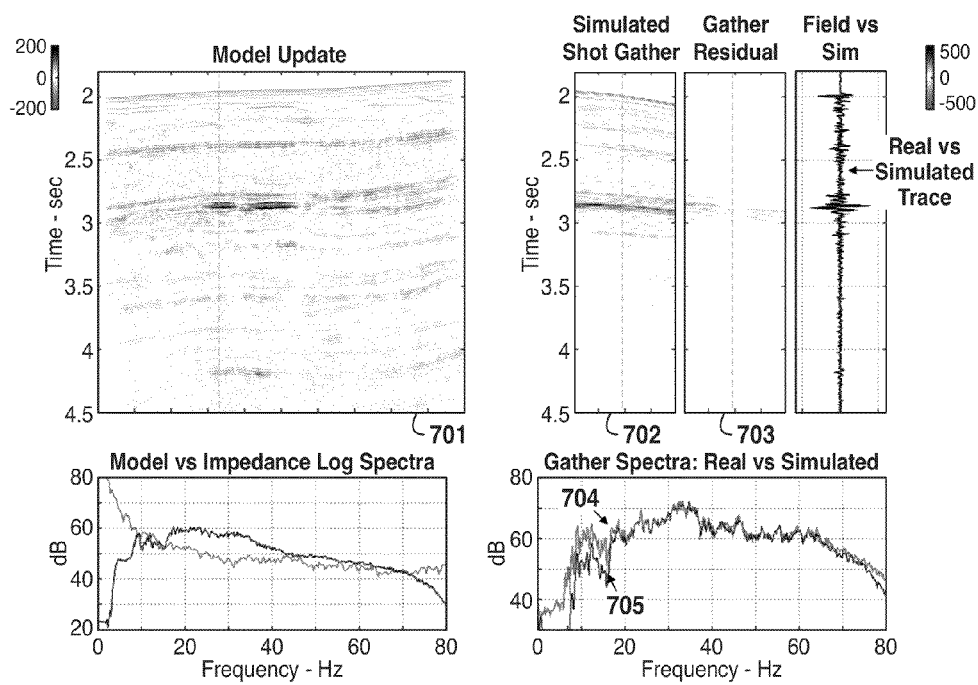
Figure 8:
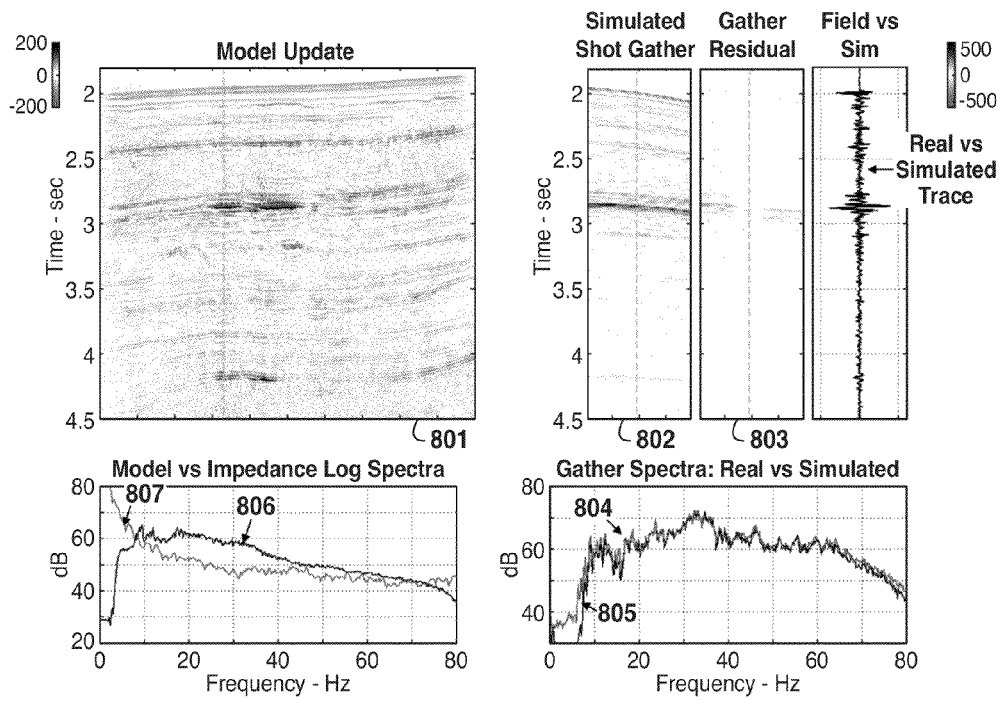

An example illustrating how the Full Wavefield Inversion process can be very slow to converge is shown in FIGS. 6, 7 and 8, illustrating the convergence behavior for a small-size 2D problem. Some of the plots present in all three figures are the cumulative model update (601, 701, 801), a simulated shot gather (602, 702, 802) and the data residual for this gather (603, 703, 803), and a comparison of the frequency spectra for real (604, 704, 804) and simulated (605, 705, 805) shot gathers. After 10 inversion iterations (FIG. 6) there is still considerable mismatch between the real and synthetic data, as is evident from an inspection of the data residuals (603) and gather spectra (604, 605). The match has considerably improved after 50 iterations (FIG. 7), but inspection of the spectra (704, 705) reveals that there are still differences for the lower frequencies. It takes about 100 iterations (FIG. 8) to reach a more complete match and, even then, there are still differences in the 5-8 Hz frequency band. The comparison (609) between a real and a simulated trace corresponds to the horizontal position indicated by the dashed vertical line in 602 and 603, and similarly in FIGS. 7-10.

Figure 9:
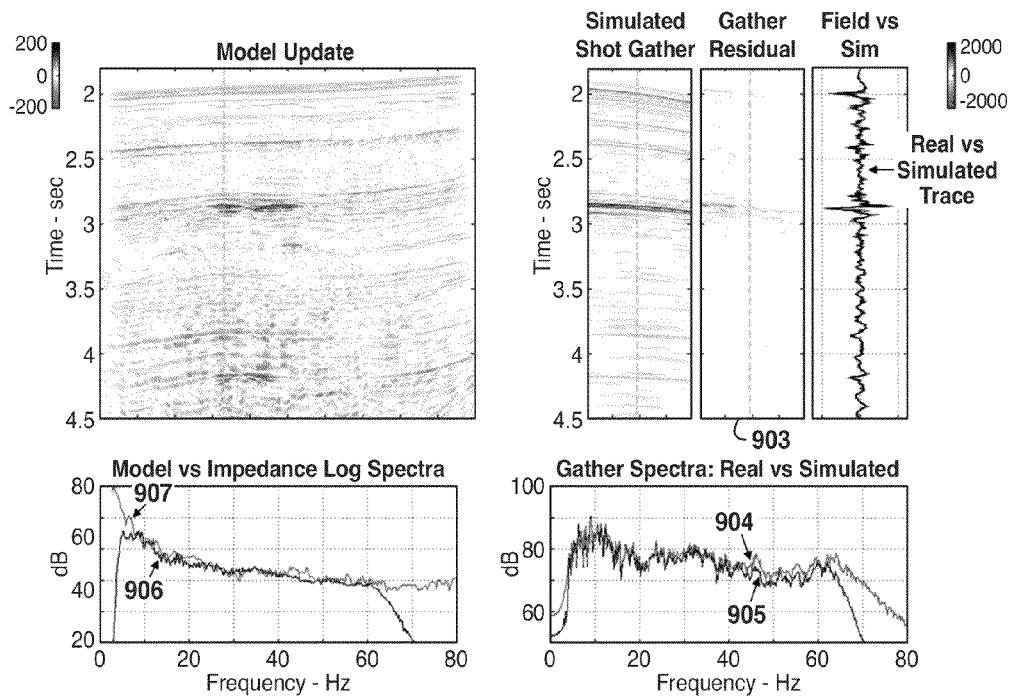
FIGS. 9-10 illustrate convergence of FWI iteration after 1 iteration (FIG. 9) and after 4 iterations (FIG. 10), with application of a shaping filter of the present invention to the seismic data and source wavelet used in the examples of FIGS. 6-8.
Figure 10:
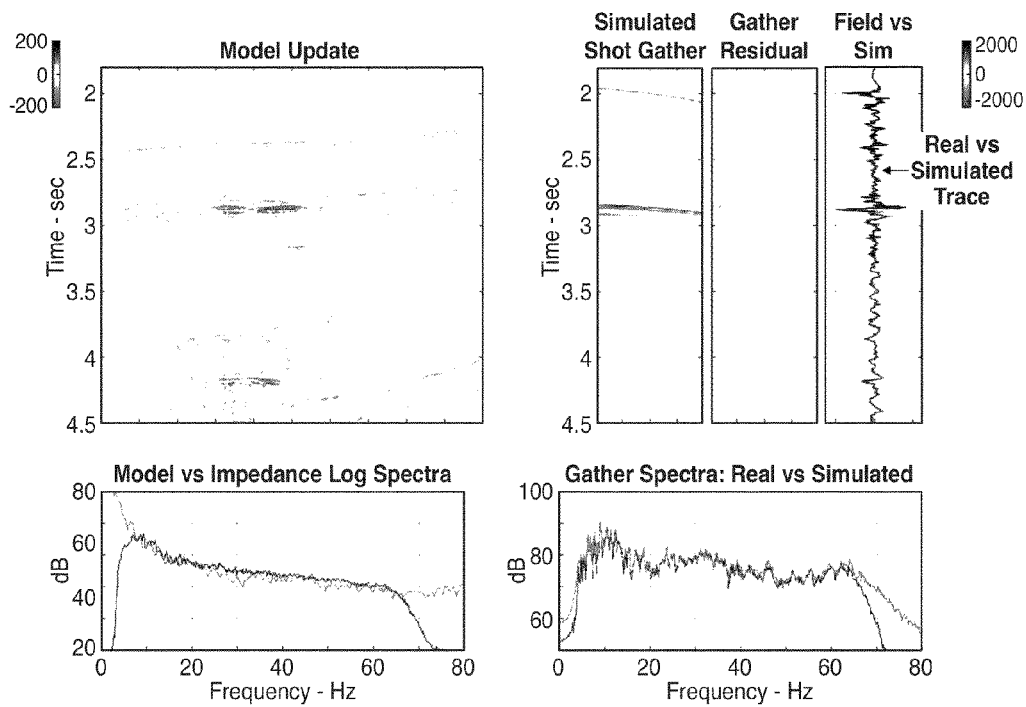

FIGS. 9 and 10 illustrate the effect of applying the disclosed invention to the same example. Notice that from the very first iteration (FIG. 9) the data residuals (903) are very small, the synthetic (905) and real (904) data spectra are very similar over the bandwidth of interest (5-60 Hz) and the spectrum of the model update (906) is very similar to the average impedance log spectrum (907). Contrast this with FIGS. 6 to 8 where the model update spectrum (606) starts quite different from the average impedance log spectrum (607), and is still somewhat different from it even after 100 iterations (806, 807). Using the spectral shaping approach described here the inversion essentially converged in 4 iterations (FIG. 10).

The cross-correlation objective function is commonly used in seismic inversion to match the phase of the data, and it is often considered to be robust when precise amplitudes cannot fit the simulation physics. In spite of its robustness to amplitude variations, the non-zero lag cross-correlation function is typically oscillatory in nature and the goal of the inversion is to find the global maximum of this function. Because of this oscillatory nature, the optimization algorithm can have difficulty in finding maxima. The problem is exacerbated when the data are noisy. If there is a mechanism to make this cross-correlation more peaked, then it will help the objective function to determine the global maximum and thereby avoiding getting stuck in local maxima. Spectral shaping helps to achieve that goal in making the correlation function peaked since it enhances the weighting towards the low frequency component of the data. Therefore shaping not only improves the convergence of FWI, but also shapes the objective function which helps the optimization algorithm to better locate the maxima of the objective function. The oscillatory nature of the cross-correlation function can also be mitigated by using the envelope of the non-zero lag cross-correlation objective function. The envelope typically has many fewer oscillations compared to the actual function. A preferred approach to compute such an envelope is the Hilbert transform of the non-zero lag cross-correlation objective function [Benitez et al., 2001].

A typical normalized cross-correlation objective function is given by:

$$\phi = \frac{d^{meas} \otimes d^{simulated}}{\|d^{meas}\|\|d^{simulated}\|}$$

where $d^{meas}$ is the measured data, $d^{simulated}$ is the simulated data, and $\otimes$ is the non-zero lag cross-correlation operator.

The shaping operation can be regarded as a convolution of shaping function with the observed data as well as the predicted data. The shaped normalized cross-correlation objective function is given by:

$$\phi_{shaped} = \frac{(S * d^{meas}) \otimes (S * d^{simulated})}{\|(S * d^{meas})\|\|(S * d^{simulated})\|}$$

where S is the shaping function that has a spectrum similar to impedance spectra (Lazaratos et. al, 2011).

Krebs et al. (PCT Patent Publication No. WO/2008/042081) have shown that inversion speed may be greatly increased by using source encoding, and simultaneously inverting many sources in a single encoded gather. A preferred embodiment disclosed in this publication changes the encoding from one iteration to the next. Routh et al. have shown that the cross-correlation objective function is particularly advantageous in simultaneous encoded-source inversion when the fixed receiver assumption is not satisfied. (U.S. patent application Ser. No. 13/224,005)

Synthetic Example

The advantages of the shaped cross-correlation objective function can be demonstrated with a synthetic example. From the observed shot gather (FIG. 11A) and predicted shot gather at convergence (FIG. 11B) before shaping, and the same two quantities after shaping (FIGS. 11C and 11D), it can be seen in FIG. 12 that after shaping the cross-correlation function is peaked and less oscillatory after shaping (121) than before shaping (122). FIG. 12 shows the normalized cross-correlation as a function of lag, with the zero-lag corresponding to index 3000 on the "x"-axis. The reduction of oscillatory nature can potentially help optimization algorithms that are global in nature in finding the maxima of the objective function such as simulated annealing, genetic algorithm, evolutionary algorithms etc. Another interesting aspect is that one can work with the envelope of the cross-correlation objective function as the quantity to be maximized. The envelope typically has much less oscillation compared to the function itself.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCES

Ben-Hadj-Ali, H., Operto, S., and Virieux, J., "Three-dimensional frequency-domain inversion with phase encoding, *Expanded Abstracts*," 79th SEG Annual Meeting, Houston, 2288-2292 (2009).

Benitez, D., Gaydecki, P. A., Zaidi, A., and Fitzpatrick, A. P., "The use of the Hilbert transform in ECG signal analysis," *Computers in Biology and Medicine*, 399-406 (2001).

Berkhout, A. J., "Areal shot record technology," *Journal of Seismic Exploration* 1, 251-264 (1992).

Dunkin, J. W., and Levin, F. K., "Effect of normal moveout on a seismic pulse," *Geophysics* 28, 635-642 (1973).

Krebs et al., "Iterative inversion of data from simultaneous geophysical sources," PCT Patent Application Publication No. WO 2008/042081.

Krebs, J., Anderson, J., Hinkley, D., Neelamani, R., Lee, S., Baumstein, A., and Lacasse, M., "Full-wavefield seismic inversion using encoded sources," *Geophysics* 74, WCC177-WCC188 (2009).

Lancaster, S., and Whitcombe, D., "Fast track "coloured" inversion," *Expanded Abstracts,* 70$^{th}$ SEG Annual Meeting, Calgary, 1572-1575 (2000).

Lazaratos, S., "Spectral Shaping Inversion for Elastic and Rock Property Estimation," *Research Disclosure*, Issue 511, (November 2006).

Lazaratos, S., and David, R. L., "Spectral shaping inversion and migration of seismic data," U.S. Publication No. 2010/0270026 (2008).

Lazaratos, S., and David, R. L., 2009, "Inversion by premigration spectral shaping," *Expanded Abstracts,* 79$^{th}$ SEG Annual Meeting, Houston.

Moghaddam, P., and Herrmann, F. J., "Randomized full-waveform inversion: a dimensionality-reduction approach," *Expanded Abstracts,* 80$^{th}$ SEG Annual Meeting, Denver, 978-982 (2010).

Routh et al., "Simultaneous source inversion for marine streamer data with cross-correlation objective function," U.S. Provisional Patent Application Ser. No. 13/224,005 (2010).

Van Riel, P., and Hendrik, W. J. D., "Method of estimating elastic and compositional parameters from seismic and echo-acoustic data," U.S. Pat. No. 6,876,928 (2005).

Zhang, Y., Sun, J., Notfors, C., Gray, S. H., Cherris, L., Young, J., 2005, "Delayed-shot 3D depth migration," *Geophysics* 70, E21-28.

The invention claimed is:

1. A computer-implemented method for accelerating convergence of iterative inversion of seismic data to obtain a model of one or more physical parameters in a subsurface region, comprising:

using local cost function optimization, wherein an assumed or current model is updated to reduce misfit between the seismic data and model-simulated data, wherein a frequency spectrum of the updated model is controlled in a first iteration and thereafter to match a known or estimated frequency spectrum for the subsurface region;

wherein the controlling of the frequency spectrum comprises applying a spectral-shaping filter to both the seismic data and to a source wavelet used to generate the model-simulated data, said spectral-shaping filter being derived according to a criterion that the spectrum of a gradient of the cost function with respect to one of the one or more physical parameters, after application of the spectral-shaping filter to both the seismic data and to a source wavelet, should match the known or estimated frequency spectrum for the subsurface region.

2. The method of claim 1, wherein updating the assumed or current model comprises computing a gradient of the cost function with respect to one of the one or more physical parameters, and then applying a spectral-shaping filter to the gradient in at least the first iteration; and wherein the model-simulated data are generated using a source wavelet having a frequency spectrum W(f) that satisfies D(f)≈fI$_p$(f)W(f), where D(f) is an average frequency spectrum of the seismic data, f is frequency, and I$_p$(f) is an average frequency spectrum of P-impedance in the subsurface region or is approximated by a frequency spectrum of a different elastic parameter of the subsurface region; and wherein said known or estimated frequency spectrum is I$_p$(f).

3. The method of claim 2, wherein the spectral-shaping filter H(f) is determined by dividing a known or estimated frequency spectrum S(f) in the subsurface region for said one of the one or more physical parameters by the gradient's spectrum before shaping G(f), where G(f) is a frequency spectrum of the gradient of the cost function with respect to one of the one or more physical parameters.

4. The method of claim 2, wherein the spectral-shaping filter varies with time.

5. The method of claim 1, wherein the known or estimated frequency spectrum for the subsurface region is obtained by averaging spectra of well logs from the subsurface region.

6. The method of claim 5, wherein models of at least two physical parameters are simultaneously obtained, and a known or estimated frequency spectrum for each physical parameter is obtained by averaging spectra of well logs measuring or corresponding to the physical parameter.

7. The method of claim 1, wherein models of at least two physical parameters are simultaneously obtained, and the frequency spectrum of each updated model in the first iteration and thereafter is controlled to match a known or estimated frequency spectrum of the corresponding physical parameter in the subsurface region.

8. The method of claim 7, wherein updating the assumed or current model of a particular physical parameter (denoted by index i) comprises computing a gradient with respect to that particular physical parameter (v) of the cost function, and then applying a spectral-shaping filter to the gradient, wherein the spectral-shaping filter is tailored to the particular physical parameter and its a known or estimated frequency spectrum, S$_i$(f), of the particular physical parameter in the subsurface region.

9. The method of claim 8, wherein the spectral-shaping filter is determined by dividing S$_i$(f) by the gradient's spectrum before shaping.

10. The method of claim 8, wherein the spectral-shaping filter varies with time.

11. The method of claim 1, wherein the one or more physical parameters are selected from a group consisting of P-impedance, S-impedance, density, P-velocity, and S-velocity.

12. The method of claim 1, wherein the model-simulated data are generated using a seismic source wavelet having a frequency spectrum w(f) satisfying, to within a proportionality constant, the following equation:

$$D(f)=fI_p(f)W(f)$$

where f is frequency, D(f) is average frequency spectrum of the seismic data, and I$_p$(f) is average frequency spectrum for P-impedance in the subsurface region or an approximation thereof based on a frequency spectrum of another elastic parameter.

13. The method of claim 12, wherein D(f) and Of) are average spectra, meaning averaged over the subsurface region.

14. The method of claim 1, wherein the cost function is a cross-correlation between the seismic data and the model-simulated data, and the optimization maximizes the cost function after the frequency spectrum control is applied to the seismic data and the model simulated data.

15. The method of claim 14, wherein source encoding is used on the seismic data and in the model simulation, and a plurality of encoded sources are simultaneously inverted.

16. The method of claim 15, wherein the encoding is changed for at least one iteration of the inversion.

17. The method of claim 1, wherein the cost function is an envelope function of a cross-correlation between the seismic data and the model-simulated data, and the optimization maximizes the cost function.

18. The method of claim 17, wherein source encoding is used on the seismic data and in the model simulation, and a plurality of encoded sources are inverted in a single inversion.

19. The method of claim 18, wherein the encoding is changed for at least one iteration of the inversion.

20. The method of claim 1, wherein the source wavelet before application of the spectral-shaping filter is chosen to have a frequency spectrum W(f) that satisfies $D(f) \approx fI_p(f)W(f)$, where D(f) is an average frequency spectrum of the seismic data, f is frequency, and where said known or estimated frequency spectrum for the subsurface region, $I_p(f)$, is an average frequency spectrum of P-impedance in the subsurface region or is approximated by a frequency spectrum of a different elastic parameter of the subsurface region.

21. The method of claim 20, wherein the spectral-shaping filter satisfies $$H(f) = \{f^{1/2} I_p(f)\} / \{A^{1/2}(f) D(f)\}$$

where A(f) is a frequency-dependent factor determined such that $$G(f) = A(f) W(f) D(f)$$

where G(f) is a frequency spectrum of a gradient of the cost function with respect to one of the one or more physical parameters.

22. A computer program product, comprising:
a non-transitory computer usable medium having a computer readable program code embodied therein, said computer readable program code adapted to be executed to implement a method for inverting seismic data to obtain a model of one or more physical parameters in a subsurface region, said method comprising using iterative inversion with local cost function optimization, wherein an assumed or current model is updated to reduce misfit between the seismic data and model-simulated data, wherein the updated model's frequency spectrum in each iteration is controlled to match an input known or estimated frequency spectrum for the subsurface region;
wherein the controlling of the frequency spectrum in each iteration comprises applying a spectral-shaping filter to both the seismic data and to a source wavelet used to generate the model-simulated data, said spectral-shaping filter being derived according to a criterion that the spectrum of a gradient of the cost function with respect to one of the one or more physical parameters, after application of the spectral-shaping filter to both the seismic data and to a source wavelet, should match the known or estimated frequency spectrum for the subsurface region.

* * * * *